(12) United States Patent
Montisci

(10) Patent No.: US 12,518,858 B2
(45) Date of Patent: Jan. 6, 2026

(54) FIELD KIT FOR A DEATH SCENE INVESTIGATION

(71) Applicant: UNIVERSITA' DEGLI STUDI DI PADOVA, Padua (IT)

(72) Inventor: Massimo Montisci, Padua (IT)

(73) Assignee: UNIVERSITA' DEGLI STUDI DI PADOVA, Padua (IT)

( * ) Notice: Subject to any disclaimer, the term of this patent is extended or adjusted under 35 U.S.C. 154(b) by 412 days.

(21) Appl. No.: 18/077,490

(22) Filed: Dec. 8, 2022

(65) Prior Publication Data

US 2023/0109623 A1 Apr. 6, 2023

Related U.S. Application Data

(63) Continuation-in-part of application No. 16/776,561, filed on Jan. 30, 2020, now abandoned.

(51) Int. Cl.
*G16H 15/00* (2018.01)
*G16H 40/60* (2018.01)

(52) U.S. Cl.
CPC ............. *G16H 15/00* (2018.01); *G16H 40/60* (2018.01)

(58) Field of Classification Search
CPC ........ G16H 15/00; G16H 40/60; G16H 20/70; G16H 10/60; G16H 30/20; G16H 50/20; G16H 50/30; G16H 70/60; G16H 40/67; G06Q 50/265
See application file for complete search history.

(56) References Cited

U.S. PATENT DOCUMENTS 8,766,789 B2 7/2014 Cosentino
2019/0244301 A1* 8/2019 Seth ................. G06F 16/73

FOREIGN PATENT DOCUMENTS

CN 209106500 U * 7/2019 ............. A47B 21/00

OTHER PUBLICATIONS

Luca Massaro M.D., Unusual Suicide in Italy: Criminological and Medico-Legal Observations—A Proposed Definition of "Atypical Suicide" Suitable for International Application, Journal of Forensic Sciences, vol. 60, Issue 3 p. 790-800 (Year: 2015).*

(Continued)

*Primary Examiner* — Joshua B Blanchette
(74) *Attorney, Agent, or Firm* — Carmel Patent Agency; Robert Ballarini

(57) ABSTRACT

A field kit for a death scene investigation includes:
a first table of values corresponding to causes of death;
a second table of values corresponding to a victim's history of mental illness;
a third table of values corresponding to consistency between death scene evidence and a suicidal dynamic;
a fourth table of values corresponding to a number of suicidal methods involved in the victim's death;
a fifth table of values corresponding to a compatibility of suicidal methods and injuries to the victim with a suicidal dynamic;
a sixth table of values corresponding to a presence of positive indicators of suicide;
a seventh table of values corresponding to a classification of death between a death compatible with a suicide and a death incompatible with a suicide;
a telecommunications device; and
a computing device comprising a memory and a processor.

14 Claims, 3 Drawing Sheets

(56) References Cited

OTHER PUBLICATIONS

Mark L. Rosenberg et al., Operational Criteria for the Determination of Suicide, Journal of Forensic Sciences, JFSCA, vol. 33, No. 6 (Year: 1988).*
WMAR Baltimore, "Device automatically calls 911 in a serious car crash", (Year: 2016).*
Katz, et al "The prevalence rates of suicide are likely underestimated worldwide: why it matters" Soc Psychiatry Psychiatr Epidemiol (2016) 51:125-127.
Cussack, et al "European Council of Legal Medicine (ECLM) principles for on-site forensic and medico-legal scene and corpse investigation" Int J Legal Med (2017) 131:1119-1122.
Van den Eeden, et al "Forensic expectations: Investigating a crime scene with prior information" Science and Justice 56 (2016) 475-481.
Goodin, et al "Mind your Manners: Part II: General Results From the National Association of Medical Examiners Manner of Death Questionnaire, 1995" The American Journal of Forensic Medicine and Pathology, vol. 18(3), Sep. 1997, pp. 224-227.
Hanzlick et al "Mind your Manners: Part III: General Results From the National Association of Medical Examiners Manner of Death Questionnaire, 1995" The American Journal of Forensic Medicine and Pathology, vol. 18(3), Sep. 1997, pp. 228-245.
Lu, et al. "Mind Your Manners—Quality of Manner of Death Certification Among Medical Examiners and Coroners in Taiwan" Am J Forensic Med Pathol 2006;27: 352-354.
Cavanagh et al. "Psychological autopsy studies of suicide: a systematic review" Psychological Medicine, 2003, 33, 395-405.
E.T. Isometsä "Psychological autopsy studies—a review" Eur Psychiatry 2001 ; 16 : 379-85.
Parai, et al. "The Validity of the Certification of Manner of Death by Ontario Coroners" Ann Epidemiol 2006;16:805-811.
Rosenberg, et al. "Operational Criteria for the Determination of Suicide" Journal of Forensic Sciences. JFSCA, vol. 33, No. 6, Nov. 1988, pp. 1445-1456.
Rockett, et al. "Discerning suicide in drug intoxication deaths: Paucity and primacy of suicide notes and psychiatric history" PLOS ONE | https://doi.org/10.1371/journal.pone.0190200 Jan. 10, 2018.
Luca Massaro "Unusual Suicide in Italy: Criminological and Medico-Legal Observations—A Proposed Definition of "Atypical Suicide" Suitable for International Application" J Forensic Sci, May 2015, vol. 60, No. 3.
Denning, et al. "Method Choice, Intent, and Gender in Completed Suicide" Suicide and Life-Threatening Behavior 30 (3) Fall 2000 pp. 282-288.
Keith Hawton "Sex and suicide Gender differences in suicidal behaviour" British Journal of Psychiatry (2000), 177, 484-485.
Gomez-Duran, et al. "Psychiatric disorders in cases of completed suicide in a hospital area in Spain between 2007 and 2010" Rev Psiquiatr Salud Ment (Barc.). 2016;9(1):31-38.
Nock, et al. "Mental disorders, comorbidity and suicidal behavior: Results from the National Comorbidity Survey Replication" Molecular Psychiatry (2010) 15, 868-876.
Evenson, et al. "Suicide rates among public mental health patients" Acta psychiat. scand. (1982) 66, 254-264.
Wasserman, et al "The European Psychiatric Association (EPA) guidance on suicide treatment and prevention" European Psychiatry 27 (2012) 129-141.
Conwell et al. "Relationships of Age and Axis I Diagnoses in Victims of Completed Suicide: A Psychological Autopsy Study" (Am J Psychiatry 1996; 153:1001-1008).
Susan J. Blumenthal, MD "A Guide to Risk Factors, Assessment, and Treatment of Suicidal Patients" Medical Clinics of North America—vol. 72, No. 4, Jul. 1988.
Lesage MD, et al. "Suicide and Mental Disorders: A Case-Control Study of Young Men" (Am J Psychiatry 1994; 151: 1063-1068).
Angst, et al. "Gender differences in depression" Eur Arch Psychiatry Clin Neurosci (2002) 252:201-209.
Montisci, et al. "Chronic Hydrocephalus and Alcohol Abuse in a Young Male Suicide" (Am J Forensic Med Pathol 2006;27: 320-323).
Pompili, et al. "Suicidal Behavior and Alcohol Abuse" Int. J. Environ. Res. Public Health 2010, 7, 1392-1431.
Yuodelis-Flores, MD, et al. "Addiction and Suicide: A Review" The American Journal on Addictions, 24: 98-104, 2015.
Barraclough, et al. "A Hundred Cases of Suicide: Clinical Aspects" Brit. J. Psychiat. (1974), 125, 355-73.
Beautrais, et al. "Prevalence and Comorbidity of Mental Disorders in Persons Making Serious Suicide Attempts: A Case-Control Study" (Am J Psychiatry 1996; 153:1009-1014).
Rihmer, et al. "Suicidal Behaviour in Patients with Mood Disorders" Evidence-based Psychiatric Care 2015;1;19-26.
Hor, et al. "Review: Suicide and schizophrenia: a systematic review of rates and risk factors" J Psychopharmacol 2010 24: 81.
Palmer et al. "The Lifetime Risk of Suicide in Schizophrenia" Arch Gen Psychiatry. 2005; 62: 247-253.
Paris, et al. "A 27-Year Follow-up of Patients With Borderline Personality Disorder" Comprehensive Psychiatry, vol. 42, No. 6 (Nov./Dec.), 2001: pp. 482-487.
Quello, et al. "Mood Disorders and Substance Use Disorder: A Complex Comorbidity" Sci. Pract. Perspect. 3 (1) (2006) 13-21.
Demirici, MD, et al. "A Series of Complex Suicide" (Am J Forensic Med Pathol 2009;30: 152-154).
Karger, et al. "Autopsy features relevant for discrimination between suicidal and homicidal gunshot injuries" Int J Legal Med (2002) 116 : 273-278.
Sindi Visentin. et al. "Suicide identification during on-site inspection. Proposal and application of an interpretive method for death scene investigation", Forensic Science Internationa vol. 297, Apr. 2019 pp. 148-155.
WMAR Staff, "Device automatically calls 911 in a serious car crash", retrieved from https://www.wmar2news.com/business/technology/device-automatically-calls-911-in-a-serious-car-crash (2016).

\* cited by examiner

FIELD KIT FOR A DEATH SCENE INVESTIGATION

CROSS REFERENCE TO RELATED APPLICATIONS

This application is a Continuation-in-part of U.S. patent application Ser. No. 16/776,561, filed Jan. 30, 2020, the entire contents of which are incorporated by reference herein as if fully set forth.

FIELD OF THE INVENTION

The present invention relates to a field kit for a death scene investigation and methods for using the field kit.

In particular, it relates to a field kit and methods for using the field kit for the investigation of a death scene in order to identify a possible suicide or a homicide and act properly.

BACKGROUND

Suicide is a serious global public health problem and the World Health Organization estimate that about 800.000 people die due to suicide every year (www.who.int/mental_health/suicide-prevention/en/). The number of suicides is higher than the homicide rates in many Western Countries. In Italy, for example, the last annual data available record 468 homicides compared to 3935 suicides (www.istat.it/it/archivio/suicidi) and several studies suggest that the rate of suicides is underestimated (C. Katz, J. Bolton, J. Sareen, The prevalence rates of suicide are likely underestimated worldwide: why it matters, Soc. Psychiatry Psychiat.r Epidemiol. 51 (Jan. (1)) (2016) 125-127).

The early correct framing of a case as suicide, as well as being useful for statistics and prevention strategies, is important for the medico-legal expert in order to arrive at the appropriate classification of the case from the beginning.
The distinction between death due to suicide, murder or accident has always been a subject of great interest in forensic medicine and the death scene investigation is critically important to identify the real dynamics of the facts.

The ambiguity of some scenarios, the complexity of the death scene and the range of information that is collected during the on-site inspection may mislead the forensic expert and lead to a vision of the event that can be strongly influenced by the preparation and the initial orientation of the medical examiner, particularly in cases of suicide that have uncommon features (D. Cusack, S. D. Ferrara, E. Keller, B. Ludes, P. Mangin, M. Väli, N. Vieira, European Council of Legal Medicine (ECLM) principles for on-site forensic and medico-legal scene and corpse investigation, Int. J. Leg. Med. 131 (Jul. (4)) (2017) 1119-1122; C. A. J. van den Eeden, C. J. de Poot, P. J. van Koppen, Forensic expectations: investigating a crime scene with prior information, Sci. Justice 56 (Dec. (6)) (2016) 475-481; J. Goodin, R. Hanzlick, Mind your manners. Part II: general results from the National Association of Medical Examiners Manner of Death Questionnaire, 1995, Am. J. Forensic Med. Pathol. 18 (Sep. (3)) (1997) 224-227; R. Hanzlick, J. Goodin, Mind your manners. Part III: individual scenario results and discussion of the National Association of Medical Examiners Manner of Death Questionnaire, 1995, Am. J. Forensic Med. Pathol. 18 (Sep. (3)) (1997) 228-245; T. H. Lu, S. M. Sun, S. M. Huang, J. J. Lin, Mind your manners: quality of manner of death certification among medical examiners and coroners in Taiwan, Am. J. Forensic Med. Pathol. 27 (Dec. (4)) (2006) 352-354).

The standardization of this phase is therefore of crucial importance for the early identification of the dynamic of the facts.

To achieve a correct suicide diagnosis, as in each diagnostic path, it is important to consider and promptly identify both risk factors and characteristic findings of a self-induced death. Suicide risk factors had been identified, in the past years, mainly through several studies based on the psychological autopsy, which is the most direct technique currently available for examining the relationship between particular antecedents and suicide (J. T. Cavanagh, A. J. Carson, M. Sharpe, S. M. Lawrie, Psychological autopsy studies of suicide: a systematic review, Psychol. Med. 33 (Apr. (3)) (2003) 395-405 Review. Erratum in: Psychol Med. 2003 July; 33(5):947; E. T. Isometsä, Psychological autopsy studies—a review, Eur. Psychiatry 16 (Nov. (7)) (2001) 379-385 Review), while findings characteristic of suicide, which allow the distinction from homicides, accidents or natural death, have been the object of a large number of studies, mainly focused on the means and injuries representative of suicidal dynamics.

Currently, in fact, there is a lack of specific international guidelines for the identification and consistent determination of suicide among medico-legal experts and coroners, even if the first operational criteria for the suicide determination date back to 1988 (J. L. Parai, N. Kreiger, G. Tomlinson, E. M. Adlaf, The validity of the certification of manner of death by Ontario coroners, Ann. Epidemiol. 16 (Nov. (11)) (2006) 805-811 Epub 2006 Apr. 18. M. L. Rosenberg, L. E. Davidson, J. C. Smith, A. L. Berman, H. Buzbee, G. Gantner, G. A. Gay, B. Moore-Lewis, D. H. Mills, D. Murray, et al., Operational criteria for the determination of suicide, J. Forensic Sci. 33 (Nov. (6)) (1988) 1445-1456).

Several studies have shown that the agreement of forensic experts on the classification of controversial but representative death scenarios varies (J. Goodin, R. Hanzlick, Mind your manners. Part II: general results from the National Association of Medical Examiners Manner of Death Questionnaire, 1995, Am. J. Forensic Med. Pathol. 18 (Sep. (3)) (1997) 224-227; R. Hanzlick, J. Goodin, Mind your manners. Part III: individual scenario results and discussion of the National Association of Medical Examiners Manner of Death Questionnaire, 1995, Am. J. Forensic Med. Pathol. 18 (Sep. (3)) (1997) 228-245; T. H. Lu, S. M. Sun, S. M. Huang, J. J. Lin, Mind your manners: quality of manner of death certification among medical examiners and coroners in Taiwan, Am. J. Forensic Med. Pathol. 27 (Dec. (4)) (2006) 352-354).

Furthermore, it has been demonstrated that prior information given to crime scene investigators influence their perception and interpretation of the death scene (C. A. J. van den Eeden, C. J. de Poot, P. J. van Koppen, Forensic expectations: investigating a crime scene with prior information, Sci. Justice 56 (Dec. (6)) (2016) 475-481), which is, in fact, interpreted differently depending on how it is presented, and both the initial and the final assessment are influenced by the prior information given. Other studies have shown that, particularly for the diagnosis of suicide, there is too much emphasis on circumstantial data and on the presence of suicide notes (I. R. H. Rockett, E. D. Caine, H. S. Connery, G. D'Onofrio, D. J. Gunnell, T. R. Miller, K. B. Nolte, M. S. Kaplan, N. D. Kapusta, C. L. Lilly, L. S. Nelson, S. L. Putnam, S. Stack, P. Värnik, L. R. Webster, H. Jia, Discerning suicide in drug intoxication deaths: paucity and primacy of suicide notes and psychiatric history, PLoS One 13 (Jan. (1)) (2018)).

A previous study has focused on the possibility of identifying cases of "typical suicide" through an interpretative analysis during the on-site inspection (L. Massaro, Unusual suicide in Italy: criminological and medico-legal observations-a proposed definition of "atypical suicide" suitable for international application, J. Forensic Sci. 60 (May (3)) (2015) 790-800), proposing a method based on the investigation of five main areas and the use of a scoring system, aimed at optimizing the study of the "body found in", particularly in cases of equivocal death (D. G. Denning, Y. Conwell, D. King, C. Cox, Method choice, intent, and gender in completed suicide, Suicide Life Threat. Behay. 30 (Fall (3)) (2000) 282-288 PubMed PMID:11079640).

This approach permits the conversion from a negative diagnosis, based on exclusion of reliable elements which might ascribe the death to murder or accident, to a positive diagnosis of suicide, within the range of parameters of scientific probability, based on the presence of elements which probably point to suicide.

The possibility of diagnosing suicide or homicide based on a standardized analysis of elements is very important for the correct initial framing of the death scene. Also, this would allow even a person who is not expert in the field to immediately take the proper actions.

It is therefore desired a method of analysis of the death scene, which allows an objective framing of the case and the early identification of those cases probably attributable to self-induced death or to homicide.

SUMMARY

It has now been found a scoring system for the correct framing of a case starting from the death scene investigation (DSI).

It is an object of the invention a field kit for a death scene investigation comprising:
 a first table of values corresponding to causes of death;
 a second table of values corresponding to a victim's history of mental illness;
 a third table of values corresponding to consistency between death scene evidence and a suicidal dynamic;
 a fourth table of values corresponding to a number of suicidal methods involved in the victim's death;
 a fifth table of values corresponding to a compatibility of suicidal methods and injuries to the victim with a suicidal dynamic;
 a sixth table of values corresponding to a presence of positive indicators of suicide;
 a seventh table of values corresponding to a classification of death between a death compatible with a suicide and a death incompatible with a suicide;
 a telecommunications device; and
 a computing device comprising a memory and a processor.

The filed kit of the invention allows a user to classify the death scene between a death compatible with a suicide and a death incompatible with a suicide based on the values of the tables.

It is a further object of the invention a method for using said field kit comprising:
 providing the field kit to an investigator;
 using the first through sixth tables to determine values and inputting the values into the computing device;
 using the computing device to obtain a total score based on the inputted values, wherein the total score is to be compared against the seventh table of values; and
 using the telecommunication device to contact a predetermined authority should the death be classified as incompatible with suicide.

It is a further object of the invention a method for using said field kit comprising:
 providing the field kit to an investigator, wherein the first through sixth tables of are stored in the memory of the computing device;
 selecting by a user input interface of the computing device a value for each of the first through sixth tables;
 using the computing device to obtain a total score based on the selected values, wherein the total score is to be compared against the seventh table of values; and
 using the telecommunication device to contact a predetermined authority should the death be classified as incompatible with suicide.

It is a further object of the invention a method for using said field kit comprising:
 providing the kit to an investigator, wherein the field kit comprises an image gathering device;
 using the image gathering device to obtain at least one image of the death scene;
 using the computing device to analyze the at least one image for an identified marker corresponding to a presence of positive indicators of suicide, wherein the computing device comprises a display;
 generating a score based on the analyzed at least one image;
 outputting the score to the investigator via the display, wherein the investigator compares the score against the first through seventh tables of values, and wherein the investigator uses the telecommunication device to contact a predetermined authority should the score be inconsistent with suicide.

It is also an object of the invention a method for contacting a predetermined entity (e.g., police, coroner, military, etc.) based on a classification of a death event comprising the following steps of:
 a) assigning a value comprised within a first predetermined numeric range to a first partial score based on the method which caused the death of a subject;
 b) assigning a value comprised within a second predetermined numeric range to a second partial score based on the subject's personal history of mental illness;
 c) assigning a value comprised within a third predetermined numeric range to a third partial score based on the consistency of the death scene evidence with suicidal dynamics;
 d) assigning a value comprised within a fourth predetermined numeric range to a fourth partial score based on the number of means that caused the death of the subject;
 e) assigning a value comprised within a fifth predetermined numeric range to a fifth partial score based on the compatibility of means and injuries with suicidal dynamics;
 f) making a sum of the values of the partial scores of steps a)-e) to obtain a total score;
 g) adding to the total score a correction factor if at least one positive indicator of suicide is present;
 h) classifying the death event as follows: if the total score is less than or equal to a first threshold the death is classified as suicide; if the total score is greater than the first threshold and it is less than or equal to a second threshold the death is classified as atypical suicide; if the score is greater than the second threshold, than the death is classified as incompatible with suicide;
 i) if the death event is classified as incompatible with suicide contacting the predetermined entity by sending to it a signal through a telecommunication system.

The method of the invention allowing the classification of death events into categories of "typical suicide", "atypical suicide" (divided into slightly, moderately and strongly atypical) and "incompatible with suicide" has been found to be efficient in the identification of self-inflicted deaths and can be useful to perform an objective evaluation of the scene, without this being influenced by the prior information received.

This method is able to provide a reliable and objective way of recording the on-site inspection findings for the initial assessment of a death scene, giving an indicator of the probability that the case is a case of suicide or homicide.

In case the classification step provides as a result that the death event is not a suicide, an immediate contact with predetermined entities, such as local police or judicial authority, is established. This is particularly useful and advantageous in case the method is performed by a non-expert user allowing him/her to immediately take the proper action.

The method has been effective in the identification of suicides in a case series applied, the total score and the partial scores being both inversely proportional to the probability of facing a suicide case.

DETAILED DESCRIPTION OF THE PREFERRED EMBODIMENTS

Figure 1:
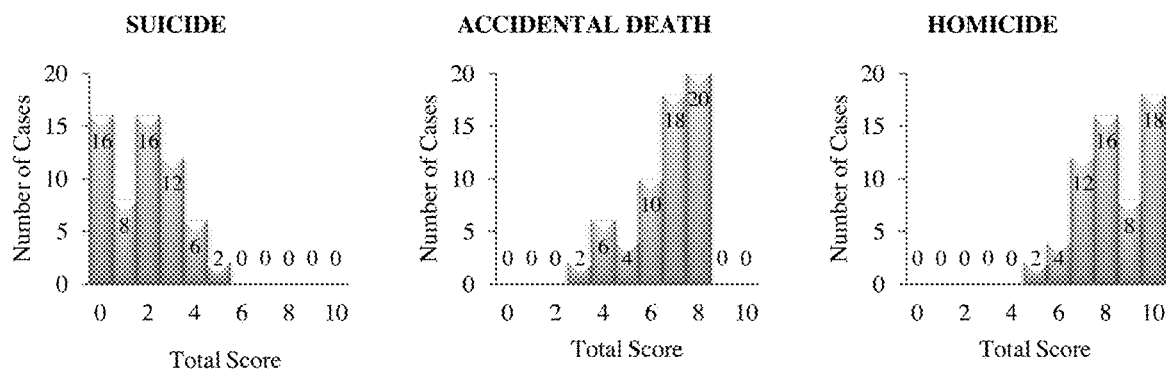
FIG. 1 are histograms representing the distribution of the number of cases for each total scores (from 0 to 10) according to the dynamics of death (suicide, accidental death, homicide).

The method is based on the assignment of a "partial score", preferably from 0 to 2, to each of five areas, which are: (1) statistical frequency of the suicidal method adopted by the victim, (2) victim's personal history of mental illness, (3) consistency of the crime scene evidence with a suicidal dynamic, (4) number of means adopted by the victim, and (5) compatibility of means and injuries with suicidal dynamics; where typically 0 is assigned to the typical characteristics of a suicidal dynamic, 1 to slightly atypical characteristics, and 2 to atypical features.

A "correction factor" can be applied in case of presence of indicators of suicide risk.

To each case corresponds a "total score" given by the arithmetic sum of the partial scores and, eventually, the correction factor, which imply the inclusion within a "category" of probability of a case of suicide: typical suicide, atypical suicide or death incompatible with suicide.

In an embodiment, the partial scores are comprised between 0 and 2. In particular, each partial score can be 0, 1 or 2. The correction factor is preferably −1.

In such embodiment, the death event is classified as follows: if the total score is comprised between 0 and 1 the death is classified as suicide; if the total score is comprised between 2 and 8 the death is classified as atypical suicide; if the score is comprised between 9 and 10, the death is classified as incompatible with suicide.

In a further embodiment, the method of the invention comprises the following steps of:

a) assigning a value between 0 and 2 to a first partial score based on the method which caused the death of a subject, wherein optionally 0 is assigned to the first partial score if the method has a statistical frequency as suicidal method greater than a first predetermined value; 1 is assigned to the first partial score if the method has a statistical frequency as suicidal method between a second predetermined value and the first predetermined value; and 2 is assigned to the first partial score if the method has a statistical frequency as suicidal method less than the second predetermined value, the first predetermined value being greater than the second predetermined value;

b) assigning a value between 0 and 2 to a second partial score based on the subject's personal history of mental illness, wherein optionally 0 is assigned to the second partial score if the subject presented at least one disorder selected from schizophrenia, borderline or antisocial personality, mood disorders, drug addiction and alcoholism; 1 is assigned to the second partial score if there is the suspicion of substance abuse and if the subject has a history of mood disorders or former addiction; 2 is assigned to the second partial score in case of absence of the above-mentioned diseases or in the case of lack of information;

c) assigning a value between 0 and 2 to a third partial score based on the consistency of the death scene evidence with suicidal dynamics, wherein optionally 0 is assigned to the third partial score if all the following events are detected: discovery of the weapon or of elements necessary for the performance of the hypothetical suicide near the cadaver, detection of a suicide note or farewell message, presence of ordered personal effects of the victim and/or absence of signs of a struggle or of forced entry in enclosed places; 1 is assigned to the third partial score in case of presence of the weapon or the elements necessary for the implementation of the hypothetical suicide in the vicinity of the cadaver and at least one of the following: absence of disorder and presence of open windows and doors or open space; and 2 is assigned to the third partial score in all the other cases;

d) assigning a value between 0 and 2 to a fourth partial score based on the number of means that caused the death of the subject, wherein optionally 0 is assigned to the fourth partial score if only one suicidal method is adopted by the subject or in case of absence of injuries to which death could be attributed; 1 is assigned to the fourth partial score if two suicidal methods are adopted; and 2 is assigned to the fourth partial score in the case of adoption of more than two suicidal methods or in case of presence of bruising and excoriations on the cadaver not attributable to precipitation;

e) assigning a value between 0 and 2 to a fifth partial score based on the compatibility of means and injuries with suicidal dynamics, wherein optionally 0 is assigned to the fifth partial score if the injuries are typical for suicide; 1 is assigned to the fifth partial score if injuries are considered on average compatible with suicide; and 2 is assigned to the fifth partial score if injuries are poorly compatible with suicide;

f) making a sum of the values of the partial scores of steps a)-e) to obtain a total score;

g) adding to the total score a correction factor of −1 if at least one positive indicator of suicide is present;

h) classifying the death event as follows: if the total score is comprised between 0 and 1 the death is classified as suicide; if the total score is comprised between 2 and 8 the death is classified as atypical suicide; if the score is comprised between 9 and 10, the death is classified as incompatible with suicide;

i) starting a call to a predetermined entity if the death event is classified as incompatible with suicide.

In step a), the statistical frequency of the suicidal method adopted by the victim is evaluated.

The statistical frequency of the method adopted for suicide varies considerably from country to country and with the gender of the victim (D. G. Denning, Y. Conwell, D. King, C. Cox, Method choice, intent, and gender in completed suicide, Suicide Life Threat. Behav. 30 (Fall (3)) (2000) 282-288; K. Hawton, Sex and suicide. Gender differences in suicidal behaviour, Br. J. Psychiatry 177 (2000) 484-485). For those reasons, the method distinguishes on the basis of sex and of the country of origin, assigning a score between 0 and 2 on the basis of the statistical frequency of choice of method of committing suicide. Such statistical data can be easily obtained by the skilled person using online available databases.

The score is assigned as disclosed above according to the principle that the less often the type of dynamics and methods of suicide are statistically represented, the greater the characteristics of atypical suicide are. See Table 1 for an example of statistical frequencies in Italy.

In a preferred embodiment, the first predetermined value is 15% and the second predetermined value is 10%.

The percentage that determines the score may be revised over time in relation to the statistical variation in prevalence/incidence of suicidal method registered over the years in each specific country.

TABLE 1

First item—partial score corresponding to the method adopted by the victim, based on its statistical frequency as a suicidal method.
Statistical frequency of the suicidal method adopted by the victim (Italy)

| Partial score | Method (male) | Method (female) |
| --- | --- | --- |
| 0 | Frequency >15% | Frequency >15% |
| 1 | 10 < frequency ≤ 15% | 10 < frequency ≤ 15% |
| 2 | Others (frequency <10%) | Others (frequency <10%) |

In step b), the victim's personal history of mental illness is evaluated. One of the most significant risk factors for suicide is the presence of psychiatric disorders (J. T. Cavanagh, A. J. Carson, M. Sharpe, S. M. Lawrie, Psychological autopsy studies of suicide: a systematic review, Psychol. Med. 33 (Apr. (3)) (2003) 395-405 Review. Erratum in: Psychol Med. 2003 July; 33(5):947; E. T. Isometsä, Psychological autopsy studies—a review, Eur. Psychiatry 16 (Nov. (7)) (2001) 379-385 Review; E. L. Gómez-Duran, M. A. Forti-Buratti, B. Gutiérrez-López, A. Belmonte-Ibáñez, C. Martin-Fumadó, Psychiatric disorders in cases of completed suicide in a hospital area in Spain between 2007 and 2010, Rev. Psiquiatr. Salud Ment. 9 (Jan.-Mar. (1)) (2016) 31-38; M. K. Nock, I. Hwang, N. A. Sampson, R. C. Kessler, Mental disorders, comorbidity and suicidal behavior. Results from the National Comorbidity Survey Replication, Mol. Psychiatry 15 (8) (2010) 868-876). The suicide risk among mental health patients is even 12 times greater than the general population (R. C. Evenson, J. B. Wood, E. A. Nuttall, D. W. Cho, Suicide rates among public mental health patients, Acta Psychiatr. Scand. 66 (1982) 254-264) and psychological autopsies established that more than 90% of completed suicides have suffered from co-morbid mental disorders [J. T. Cavanagh et al.; E. T. Isometsä et al.; D. Wasserman, Z. Rihmer, D. Rujescu, M. Sarchiapone, M. Sokolowski, D. Titelman, et al., The European Psychiatric Association (EPA) guidance on suicide treatment and prevention, Eur. Psychiatry 27 (2012) 129-141).

The diseases most frequently associated with suicide are mood disorders, such as depressive disorders and bipolar disorders, schizophrenia, drug addiction and alcoholism, sometimes associated with specific neurobiological abnormalities. Overall, 30-90% of all suicides have suffered from mood disorders preceding the fatal act, with a strong association between major depression and suicide (Y. Conwell, P. R. Duberstein, C. Cox, J. H. Herrmann, N. T. Forbes, E. D. Caine, Relationships of age and axis I diagnoses in victims of completed suicide: a psychological autopsy study, Am. J. Psychiatry 153 (1996) 1001-1008. S. J. Blumenthal, Suicide. A guide to risk factors assessment and treatment of suicidal patients, Med. Clin. N. Am. 72 (1988) 937-971[22] A. D. Lesage, R. Boyer, F. Grunberg, C. Vanier, R. Morissette, C. Menard-Buteau, M. Loyer, Suicide and mental disorders: a case-control study of young men, Am. J. Psychiatry 151 (1994) 1063-1068; J. Angst, A. Gamma, M. Gastpar, J. P. Lepine, J. Mendlewicz, A. Tylee, Gender differences in depression: epidemiological findings from the European DEPRES I and II studies, Eur. Arch. Psychiatry Clin. Neurosci. 252 (2002) 201-209).

Also, drug addiction and alcoholism lead to a high risk of suicide. Among alcoholics, the lifetime risk of suicide is about 10-15%. Depression and/or alcoholism were comorbid in 85% of suicides (M. Montisci, C. Terranova, R. Snenghi, S. D. Ferrara, Chronic hydrocephalus and alcohol abuse in a young male suicide, Am. J. Forensic Med. Pathol. 27 (Dec. (4)) (2006) 320-323; M. Pompili, G. Serafini, M. Innamorati, G. Dominici, S. Ferracuti, G. D. Kotzalidis, G. Serra, P. Girardi, L. Janiri, R. Tatarelli, L. Sher, D. Lester, Suicidal behavior and alcohol abuse, Int. J. Environ. Res. Public Health 7 (Apr. (4)) (2010) 1392-1431; C. Yuodelis-Flores, R. K. Ries, Addiction and suicide: a review, Am. J. Addict. 24 (2015) 98-104; B. Barraclough, J. Bunch, B. Nelson, P. Sainsbury, A hundred cases of suicide: clinical aspects, Br. J. Psychiatry 125 (1974) 355-373; Y. Conwell, P. R. Duberstein, C. Cox, J. H. Herrmann, N. T. Forbes, E. D. Caine, Relationships of age and axis I diagnoses in victims of completed suicide: a psychological autopsy study, Am. J. Psychiatry 153 (1996) 1001-1008; A. L. Beautrais, P. R. Joyce, R. T. Mulder, D. M. Fergusson, B. J. Deavoll, S. K. Nightingale, Prevalence and comorbidity of mental disorders in persons making serious suicide attempts: a case-control study, Am. J. Psychiatry 153 (1996) 1009-1014; Z. Rihmer, A. Rihmer, P. Dome, Suicidal behaviour in patients with mood disorders, Evid. Based Psychiatric Care 1 (2015) 19-26).

Schizophrenia and some personality disorders have also been demonstrated as risk factors for suicide (lifetime risk of suicide of 5% in schizophrenic and 10% in borderline and antisocial personality disorders (Z. Rihmer, A. Rihmer, P. Dome, Suicidal behaviour in patients with mood disorders, Evid. Based Psychiatric Care 1 (2015) 19-26. K. Hor, M. Taylor, Suicide and schizophrenia: a systematic review of rates and risk factors, J. Psychopharmacol. 24 (Nov. (4 Suppl)) (2010) 81-90. B. A. Palmer, V. S. Pankratz, J. M. Bostwick, The lifetime risk of suicide in schizophrenia: a reexamination, Arch. Gen. Psychiatry 62 (2005) 247-253. J. Paris, H. Zweig-Frank, A 27-year followup of patients with borderline personality disorder, Compr. Psychiatry 42

(2001) 482-487. S. B. Quello, K. T. Brady, C. S. Sonne, Mood disorders and substance use disorder: a complex comorbidiy, Sci. Pract. Perspect. 3 (1) (2006) 13-21).

In an embodiment of the present method, a score 0 is assigned in cases of disorders like schizophrenia, borderline or antisocial personality, and in cases of mood disorders, drug addiction or alcoholism; a score of 1 when there is the suspicion of substance abuse and for those with a history of mood disorders or former addiction, as summarized in Table 2. The score of 2 is assigned in case of absence of the above-mentioned diseases or in the case of lack of information.

Mood disorders can be for example depression, bipolar disorders, major depressive disorder, seasonal affective disorder (SAD), bipolar I disorder (i.e., manic depression), bipolar II disorder (ie mania, hypomania), cyclothymic disorders, disruptive mood dysregulation disorder, persistent depressive disorder (i.e., dysthymic disorder or dysthymia), premenstrual dysphoric disorder (from DSM V).

TABLE 2

Second item—partial score corresponding to the victim's personal history of mental illness.
2) Victim's personal history of mental illness

| Partial score | History of mental illness |
|---|---|
| 0 | At least one between: mood disorders (depression, bipolar disorder, etc.) drug addiction alcoholism personality disorders with high risk of suicide (borderline, antisocial) schizophrenia |
| 1 | At least one between: former drug/alcohol addiction history of mood disorders drug abuse |
| 2 | Exclusion from the score 1 and 2 or lack of information |

Step c) evaluates the consistency of the death scene evidence with suicidal dynamics.

Evidence collected at the death scene is one of the key points for the early identification of suicides.

Three eventualities are reported, sometimes essential in the reconstruction of a suicidal dynamic. The first is the discovery of the weapon or of elements necessary for the performance of the hypothetical suicide near the cadaver.

Such elements can be selected from the group consisting of: firearms, knives, empty pharmaceutical confections or substances used for poisoning, a chair or other raised element in case of complete hanging.

The second eventuality is the detection of a suicide note or farewell message, in which suicidal ideation is reported, or the victim apologizes for his action or the presence of ordered personal effects of the victim. Such personal effects can be close to the body or, in the case of drowning or precipitation, in the place where the victim is suspected to have put his idea into practice. The third eventuality is absence of signs of a struggle, or of forced entry in enclosed places.

Based on these considerations, partial scores of 0, 1 and 2 can be assigned, as summarized in Table 3.

TABLE 3

Third item—partial score corresponding to the consistency of the crime scene evidence with a suicidal dynamic.
3) Consistency of the crime scene evidence with a suicidal dynamic

| Partial score | Findings |
|---|---|
| 0 | All of these the presence of the weapon or elements necessary for the performance of the hypothetical suicide around the corpse suicide note or farewell message or finding of the ordered personal effects of the victim absence of signs of a struggle (or burglary as regards enclosed places) |
| 1 | Presence of the weapon or the elements necessary for the implementation of the hypothetical suicide in the vicinity of the cadaver + at least one of the following: absence of disorder presence of open windows and doors (indoors) or open space |
| 2. | Exclusion from the score 0 and 1 |

Step d) evaluates the number of means.

The use of multiple means for committing suicide often increases the difficulties in differentiation between suicide and homicide. Many studies have labelled those cases with the name "complex suicide" (S. Demirci, K. H. Dogan, Z. Erkol, I. Deniz, A series of complex suicide, Am. J. Forensic Med. Pathol. 30 (2009) 152-154), that is consensually defined as the use of more than one method to induce death. According to statistical evaluations, up to 5% of all suicides can be classified as complex suicide.

Being the most common occurrence, the score 0 is assigned to cases where only one method is adopted or in case of absence of injuries to which death could be attributed. This last case occurs when the differential diagnosis are poisoning death. Score 1 is assigned when two suicidal methods are adopted and score 2 in the case of adoption of more than two methods or in case of presence of bruising and excoriations on the cadaver not attributable to precipitation (Table 4).

For suicidal method is intended a self-inflicted manner of death with evidence (either explicit or implicit) of intent to die (ie the act of intentionally causing one's own death).

Suicidal methods are for example hanging (suffocation), poisoning (overdose), firearms, falls.

TABLE 4

Fourth item—partial score corresponding to the number of means
4) Number of means

| Partial score | Number of means |
|---|---|
| 0 | absence of injuries to which death could be attributed one |
| 1 | two |
| 2 | >two | abrasions, escoriations and contusions not attributable to precipitation

Step e) evaluates the compatibility of means and injuries with suicidal dynamics.

In many cases of violent death the body injury pattern is critically important for the differential diagnosis between suicide, murder and accidental death. The proposed score identifies typical characteristics of a suicidal dynamic, differentiating them based on the methods adopted by the victim.

In an embodiment, score 0 indicates that the injuries are typical for suicide, value 1 indicates that injuries are considered on average compatible with suicide and 2 poorly compatible or not detectable.

In those methods where the injury pattern analysis does not usually help in the differential diagnosis during the on-site inspection, like rail crashes, car accidents, precipitation, or self-incineration, a score 2 is assigned.

Exemplary embodiments are disclosed in the following.

When the injuries are due to drowning, firearms, bladed weapons, hanging, smothering, poisoning or strangulation, scores can be assigned as disclosed in the following Table 5.

TABLE 5

Fifth item—partial score corresponding to the compatibility of means and injuries with a suicidal dynamic.
5) Compatibility of means and injuries with a suicidal dynamic

| Partial score | Features |
|---|---|
| Drowning | |
| 0 | At least one among:<br>related injuries (e.g. wrist slashing)<br>absence of injuries<br>self-tied knots or weights |
| 1 | Association with ecchymosis and bruising or other not lethal injuries |
| 2 | Exclusion from the score 0 and 1 |
| Firearms | |
| 0 | All of these:<br>typical localization—short barrel weapons: mouth, temporal and precordial regions<br>long-barreled weapons: chin and abdomen<br>contact or close-range gunshot wounds<br>direction bottom-up<br>use of the right hand in right-handed subjects, of the left hand in the left-handed<br>presence of gunpowder residues and/or blood splashes on the victim's hand |
| 1 | Typical localization + at least one among:<br>contact or close-range gun shotgun wounds<br>direction bottom-up<br>use of the right hand in right-handed subjects, the left hand in the left-handed |
| 2 | Exclusion from the score 0 and 1 |
| Bladed weapons | |
| 0 | All of these:<br>typical localization (incised wounds: inner surface of wrists and forearms, neck; stab wounds: heart region, neck, abdomen)<br>hesitation marks<br>no damages to clothes<br>parallel injuries |
| 1 | Typical localization + at least one among:<br>hesitation marks<br>no damages to clothes<br>parallel injuries |
| 2 | At least one among:<br>defensive wounds<br>chop wounds<br>no typical localization<br>exclusion from the score 0 and 1 |
| Hanging | |
| 0 | All of these:<br>complete hanging<br>oblique, discontinuous, excoriated, unevenly deep ligature furrows in the neck<br>absence of other injuries (with the exception of wrist slashing) |
| 1 | Oblique, discontinuous, excoriated, unevenly deep groove in the neck + at least one between:<br>incomplete hanging<br>no petechiae |
| 2 | At least one among:<br>other injuries<br>not excoriated ligature furrows<br>exclusion from the score 0 and 1 |

TABLE 5-continued

Fifth item—partial score corresponding to the compatibility of means and injuries with a suicidal dynamic.
5) Compatibility of means and injuries with a suicidal dynamic

| Partial score | Features |
|---|---|
| Smothering | |
| 0 | All of these:<br>presence of objects suitable to cause a simultaneous forced occlusion of mouth and nose still on the body<br>absence of injuries in the inner part of the cheeks and of the lips and absence of ecchymosis and excoriations of the skin on the nose and the mouth<br>absence of injuries possibly due to struggle |
| 1 | Presence of objects suitable to cause a simultaneous forced occlusion of mouth and nose still on the body +<br>At least one between:<br>injuries in the inner part of the cheeks and of the lips<br>ecchymosis and excoriations of the skin on the nose and the mouth |
| 2 | presence of injuries possibly due to struggle<br>exclusion from the score 0 and 1 |
| Poisoning | |
| 0 | association with wrist slashing or other suicidal method |
| 1 | absence of injuries |
| 2 | exclusion from the score 0 and 1 |
| Strangulation | |
| 0 | All of these:<br>horizontal, continuous, excoriated and equally deep ligature furrow<br>knotting<br>absence of other injuries (with the exception of wrist slashing) |
| 1 | All of these:<br>horizontal, continuous, excoriated and equally deep ligature furrow multiple revolutions |
| 2 | At least one between:<br>association with other injuries<br>semicircular skin lacerations possibly attributable to finger-nails and scratches on the neck<br>exclusion from the score 0 and 1 |

In firearm suicides the parts of the body commonly affected are the mouth, the temple and the chest (precordial region) in case of short barrel weapons, while in the case of long-barreled weapons the preferred areas are the chin and the abdomen. The direction of the shot is commonly bottom-up, with the use of the dominant arm. In gunshots to the head right-handed subjects prefer the use of the right hand, and left-handed subjects the left. Gunshot inlet wounds are usually those of contact or close range and the presence of gunpowder residues on the victim's hand means that the victim was involved in the shooting, which is why it is often a crucial element for the medico-legal identification of suicide cases, such as the presence of blood splashes on the hand used for the shot.

Suicidal incised wounds are frequent in the inner surface of wrists and forearms (wrist slashing) or on the neck (throat cutting); while stab wounds are commonly in the region of the heart, neck or abdomen, preceded by the denuding of the part of the body affected and are frequently repeated, parallel and close to each other. Commonly, hesitation marks are present, thin and superficial, symmetrical with respect to the deeper injuries. Conversely, in cases of murder, injuries with defense injuries located on the upper arms, instinctively outstretched to protect vital parts. Chopping injuries are extremely rare in suicide, observed in alienated people and made by self-inflicted injuries on the top of the head.

Referring to deaths due to asphyxia, hanging is a typical method used by suicides. Oblique, discontinuous and unequally deep ligature furrows are the most important types of evidence, even if it is present in simulated hangings or cadaver suspension. In those cases, the differential diagnosis is based on the vitality characteristic of the injuries, particularly on the presence of hemorrhages, bruising in proximity of the ligature furrow. Suicide by self-strangulation, although not frequent, can cause important difficulties in the distinction from homicide. It presupposes a constriction of the neck that lasts beyond the loss of consciousness implying the use of method by the victim to prevent the release of the tourniquet (i.e., multiple revolutions or knotting). The ligature furrow in these cases is continuous, horizontal and equally deep around the perimeter of the neck, and in most cases, it is the only finding detectable, while in cases of murder the victim often shows signs of a struggle, semicircular skin lacerations possibly attributable to fingernails and scratches on the neck, inflicted in an attempt to break free from the noose.

Smothering is rarely used as a suicidal method and mostly by individuals suffering from psychiatric diseases, who occlude the nose and mouth with objects crammed into the airway, or use a plastic bag to cover the head. A homicide dynamic is also rare in adults and, in those cases, external findings are usually ecchymosis and excoriation on the mouth and on the nose, due to the compression of the aggressor's hands directly or through other means. Significant in cases of direct suffocation could be injuries on the internal part of the lips and the cheeks, represented by bruises and small tears produced by the teeth.

Asphyxiation by drowning is a common method of suicide but, frequently, it is not easy to distinguish between a suicidal and accidental dynamic. The suicidal nature of death is suggested by the presence of associated lesions, such as wrist slashing, of self-made ligature or use of weights. Particular importance in such cases is attributed to medical history and circumstantial data, such as the discovery of suggestive findings (i.e., farewell messages) and the results of the judicial inspection (i.e., clothes of the victim found neatly folded along the river). Murder cases are rare and they are usually due to the stunning of the victim caused through other forms of violence, resulting in injuries to the corpse.

In most cases of poisoning, there are no injuries detectable, but in some cases the association with other injuries attributable to self-inflicted methods, such as the presence of cut injuries on the volar surface of the wrists, is indicative of suicide.

In step f) the values inserted in the preceding steps a)-e) are summed obtaining a total score.

In step g) a correction factor can be input.

In other words, in step g) a correction factor is added to the total score if at least one positive indicator of suicide is present.

The correction factor is preferably −1.

This correction factor is based on the result of the analysis of any changes in lifestyle or habits on the part of the subject prior to death.

In particular, said correction factor is assigned if at least one of the positive indicators of suicide disclosed in Table 6 is present.

TABLE 6

Correction factor of the total score, based on the presence of positive indicators of suicide (i.e. risk factors).
Correction factor

| Partial score | Positive indicators of suicide |
|---|---|
| 1 | at least one between:<br>Isolating oneself from friends and/or family members<br>Communicating to relatives or friends a conviction of the meaninglessness of life (hopeless life)<br>Getting rid of personal items of sentimental value<br>A sudden improvement in mood after a period of mood deflection<br>Neglecting personal hygiene and physical appearance<br>Purchasing or accumulating pharmaceutical drugs<br>Purchasing or procuring firearms<br>Sudden renewed interest or loss of interest in religion<br>Neglecting hobbies or daily routines<br>Making appointments with a doctor for slight or dubious ailments<br>Resigning from one's job<br>Sudden interruption of work<br>Change in performance at school, university, or work<br>Changes in sleep and appetite patterns |

In step h), the death event is classified depending on the total score obtained in step g), wherein a correction factor has been added to the total score if at least one positive indicator of suicide is present.

In a particular embodiment, when the score is between 2 and 8, the death event is classified as atypical suicide. It can be further classified in slightly atypical suicide if the score is comprised between 2 and 3, in moderately atypical suicide if the score is between 4 and 5, in strongly atypical suicide if the score is comprised between 6 and 8, as shown in the following Table 7.

TABLE 7

Total scores corresponding to each category.

| Total score | Category | |
|---|---|---|
| 0-1 | Typical suicide | |
| 2-3 | Atypical suicide | Slightly |
| 4-5 | | Moderately |
| 6-7-8 | | Strongly |
| 9-10 | Death incompatible with suicide | |

In step i) a predetermined entity is contacted if the death event has been classified in the previous step as incompatible with suicide.

In particular, the predetermined entity is contacted by means of a signal which is sent through a telecommunication system.

The signal to the predetermined entity can be a data signal.

The signal to the predetermined entity can be an analog or digital signal.

The signal to the predetermined entity can be at least one of the following types: electrical, electromagnetic wave, optical, radio wave, light signal, audio signal. In particular, It can be a phone call or a phone message.

The telecommunication system can comprise a wireless communication network and/or wired communication network. The telecommunication system can include at least one of the following network types: computer network, a telephone network, internet.

Said predetermined entity is usually an entity which should be informed in case of a homicide. It can be for example local and/or national police and/or local and/or national judicial authority.

It is also an object of the invention a computer program for carrying out the method above disclosed.

In particular, the computer program comprises instructions which, when the program is executed by a computer, cause the computer to carry out the method above disclosed.

A computer-readable data carrier having stored thereon said computer program is also within the scope of the invention.

A data processing device comprising a processor configured to perform the method above disclosed is a further object of the invention.

Said data processing device may be an electronic device, such as a computer, a mobile phone or a tablet, which comprises said computer-readable data carrier.

Said electronic device is also object of the invention.

In an exemplary embodiment, the data processing device may comprise an input interface by means of which a user can insert answers regarding different items detected in the crime scene according to the method of the invention and a output interface by means of which the computer program stored in the data processing device provides to the user a numerical output indicative of suicide, murder or accidental death based on the inserted answers.

The data processing device is also able to feed itself with the data entered, implementing in turn the validation of the method by processing the entered data.

EXAMPLES

The method proposed was retrospectively applied to 180 cases of suspicious death in which both death scene investigation and standard forensic autopsy were performed. The cases, randomly selected from the database of the Legal Medicine of Padua University were divided equally between suicides, homicides and accidental deaths (B. Karger, E. Billeb, E. Koops, B. Brinkmann, Autopsy features relevant for discrimination between suicidal and homicidal gunshot injuries, Int. J. Legal Med. 116 (Oct. (5)) (2002) 273-278). The period examined was between 2001 and 2017, with the exclusion of those cases with ages inferior to 18 years old at the time of death.

In all 180 cases the death scene investigation report was analyzed, together with health records, the on-site external examination of the body and circumstantial data with preliminary statements from relatives and/or suspects to the police officers. The analysis was blindly conducted.

The results were then compared with the definite dynamic of occurrence of the facts, ascertained at the completion of the investigations. Quantitative variables (partial and total scores) were analyzed reporting the mean and the median, and compared between dynamic categories by Kruskall-Wallis test. Predictive ability of the score in forecasting suicides was analyzed by univariate logistic regression, and the result reported as odds-ratio with 95% confidence interval.

Results

Total score

The results show a statistical correlation between the value of the total score and the probability of a suicidal dynamic (median: 2 suicides, 7 accidental deaths, 8 homicide), with a predominance of low scores in suicide cases, while in cases of accidental deaths, and even more in cases of homicide, scores lower than 3 are not registered and the main part obtain a score greater than or equal to 7 (FIG. 1). The increasing of every mark in the total score rises more than seven times the probability of a non-suicidal case, as shown by the Odds Ratio (7.41; IC 95% [2.28-24.02]).

Partial score

Results show also a correlation between the value attributed to each item of the score and the probability of facing a suicide, as is reflected by the comparison among the means of the score attributed in each of the criteria, divided on the basis of the dynamic (Table 8), with the exception of the criteria "Number of means", which assumes a partial score of 0 in all cases of accidental deaths.

TABLE 8

Mean of the partial scores given to each item, divided according to the dynamic (suicide, accidental death, homicide).

| | Mean of the partial score | | | | |
| --- | --- | --- | --- | --- | --- |
| | Item 1 | Item 2 | Item 3 | Item 4 | Item 5 |
| Dynamic Suicide | 0.8 | 0.5 | 0.3 | 0.1 | 0.1 |
| Accidental death | 1.8 | 1.6 | 1.7 | 0 | 1.5 |
| Homicide | 1.8 | 1.8 | 1.9 | 0.9 | 1.8 |

Item 1-statistical frequency of the method adopted by the victim; item 2-victim's personal history of mental illness; item 3-consistency of the crime scene evidence with a suicidal dynamic; item 4-number of means; item 5-compatibility of means and injuries with a suicidal dynamic.

Categories

Figure 2:
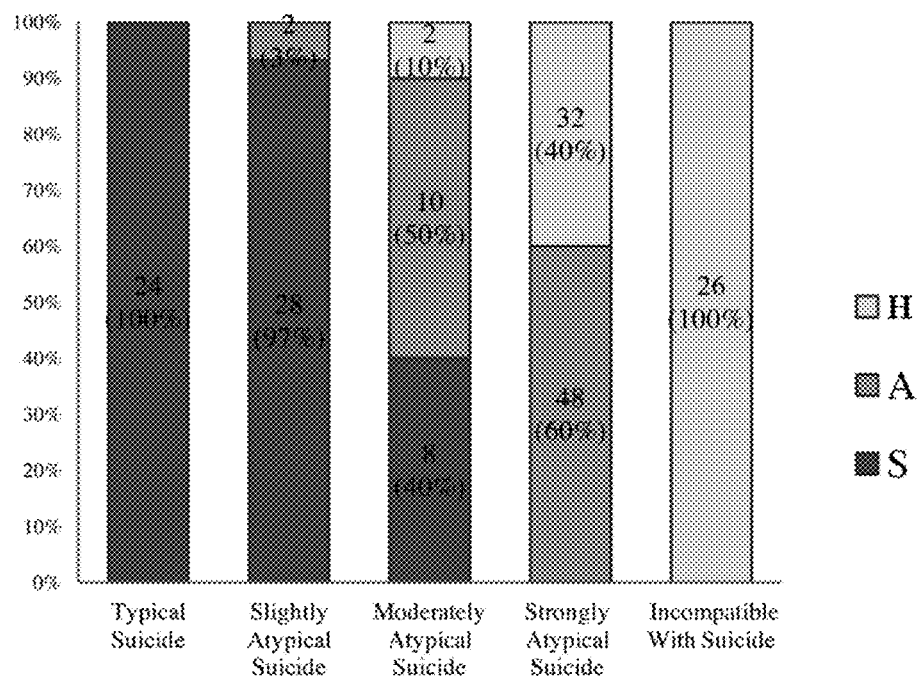
FIG. 2 is a histogram representing absolute and relative (within parenthesis) frequency of suicide (S), accidental death (A) and homicide (H) in each category.

Concerning the subdivision into categories of the 180 cases analyzed, 24 have obtained a mark of 0 or 1, therefore belonging to the "typical suicide" category, while 26 cases have obtained higher marks of 9 or 10, therefore belonging to the "incompatible with suicide" category. In these cases, the agreement of the final result with the effective dynamics was 100% as all 24 typical suicides corresponded to the suicide dynamics while all the 26 cases not compatible with suicide corresponded to homicide dynamics (FIG. 2).

The 130 cases that have reached an intermediate value, from 2 to 8, belong to the category of the "atypical suicide" and are subdivided as follows:

"slightly atypical suicide" (values 2 or 3): 28 suicides, 2 accidental deaths, 0 homicides;

"moderately atypical suicide" (values 4 or 5): 8 suicides, 10 accidental deaths, 2 homicides;

"strongly atypical suicide" (values 6, 7 or 8): 0 suicides, 48 accidental deaths, 32 homicides.

Conclusions

This scale aims to give a reliable and objective way of recording the on-site inspection findings for the initial assessment of a death scene, giving an indicator of the probability that the case is a case of suicide.

The score, in fact, was effective in the identification of suicides in the case series applied, the total score and the partial scores being both inversely proportional to the probability of facing a suicide case.

The exception of the partial score "number of means", as resulting from the analysis of the median of the partial score (Table 8), is explained by the fact that an accidental death is generally caused by only one method. This feature, may allow the identification of cases that correspond, with high probability, to homicide dynamics, which are those that fall in the "incompatible with suicide" category (total score 9-10).

Based on the data collected, the best cut-off value to select for distinguishing a suicidal method from one that is not suicidal, with a high level of probability, is 4. In the cases that have been analysed, it can be seen that a value less than 4 represents 87% of suicide cases, compared to 3% of accidental deaths and 0% of homicide cases.

In cases where it is not possible to obtain the information already listed during the on-site inspection, the score can also be completed during the subsequent post-mortem investigations.

This study provides the first objective interpretative method of analysis of the death scene that, without expecting to reduce the complex death scene activities to the mere application of this method, and without aiming to replace all the necessary post-mortem ascertainments, can be used as a prognostic indicator of the likelihood of being faced with a case of suicide, while the higher the total score, the more difficult can be the management for the assessment of the manner of death and the inter-expert agreement.

In conclusion, the proposed score and the subsequent classification of suicides into categories of "typical suicide", "atypical suicide" (divided into slightly, moderately and strongly atypical) and "incompatible with suicide" have been found to be efficient in the identification of self-inflicted deaths and can be useful to perform an objective evaluation of the scene, without this being influenced by the prior information received.

Field Kit

Figure 3:
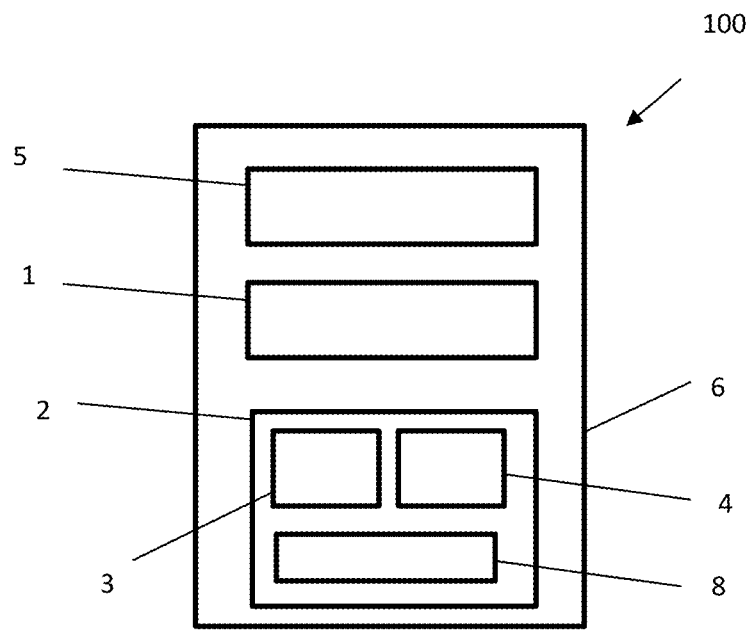
FIG. 3 is a schematic representation of an embodiment of a filed kit according to the invention.

FIG. 3 schematically illustrates an embodiment of the field kit 100 of the invention.

The field kit 100 comprises:
- a first table of values corresponding to causes of death;
- a second table of values corresponding to a victim's history of mental illness;
- a third table of values corresponding to consistency between death scene evidence and a suicidal dynamic;
- a fourth table of values corresponding to a number of suicidal methods involved in the victim's death;
- a fifth table of values corresponding to a compatibility of suicidal methods and injuries to the victim with a suicidal dynamic;
- a sixth table of values corresponding to a presence of positive indicators of suicide;
- a seventh table of values corresponding to a classification of death between a death compatible with a suicide and a death incompatible with a suicide;
- a telecommunications device 1; and
- a computing device 2 comprising a memory 3 and a processor 4.

In an embodiment, the first through sixth tables may be paper tables (hard-copies) or digital tables.

In an embodiment, the values of the first table are comprised within a first predetermined numeric range according to step a).

The first table may correspond to the above-mentioned Table 1 wherein the values of the first table correspond to the values of the column "partial score" of the Table 1.

In an embodiment, the values of the second table are comprised within a second predetermined numeric range according to step b).

The second table may correspond to the above-mentioned Table 2 wherein the values of the second table correspond to the values of the column "partial score" of the Table 2.

In an embodiment, the values of the third table are comprised within a third predetermined numeric range according to step c).

The third table may correspond to the above-mentioned Table 3 wherein the values of the third table correspond to the values of the column "partial score" of the Table 3.

In an embodiment, the values of the fourth table are comprised within a fourth predetermined numeric range according to step d).

The fourth table may correspond to the above-mentioned Table 4 wherein the values of the fourth table correspond to the values of the column "partial score" of the Table 4.

In an embodiment, the values of the fifth table are comprised within a fifth predetermined numeric range according to step e).

The fifth table may correspond to the above-mentioned Table 5 wherein the values of the fifth table correspond to the values of the column "partial score" of the Table 5.

In an embodiment, the values of the sixth table are comprised within a predetermined numeric range according to the correction factor of step g).

The sixth table may correspond to the above-mentioned Table 6 wherein the values of the sixth table correspond to the values of the column "partial score" of the Table 6.

In this case, the column "partial score" may comprise only one value, i.e., −1.

In an embodiment, the values of the seventh table are comprised within a predetermined numeric range according to the step h).

The thresholds of the step h) may correspond to respective values of the seventh table.

The seventh table may correspond to the above-mentioned Table 7 wherein the values of the seventh table correspond to the values of the column "total score" of the Table 7.

The field kit 100 for a death scene investigation may comprises an image-gathering device 5.

The image-gathering device 5, the telecommunications device 1 and the computing device 2 may be contained in a single unit 6.

In an embodiment, the field kit 100 comprises a mobile device which comprises the image gathering device 5, the telecommunications device 1 and the computing device 2.

For instance, the mobile device may be a smartphone, a tablet, a laptop or a smartwatch.

In an embodiment, the first through sixth tables are stored in the memory 3 of the computing device 2.

In an embodiment, the computing device 2 comprises a user input interface 7 that prompts a user to select a value for each of the first through sixth tables.

The selection of a value may comprise to choose or to input the value by the user input interface 7.

In an embodiment, the values of each of the first through sixth tables correspond to at least one related label and a value is assigned by selecting at least one label for each of the first through sixth tables.

The labels may be displayed by the user input interface 7.

The labels may be texts.

In an embodiment, the labels of the first table describe several types of causes of death, each type being related to a value of the first table.

The labels of the first table may correspond to the descriptions of the column "Method" of the above-mentioned Table 1.

In an embodiment, the labels of the second table describe several types of victim's histories of mental illness, each type being related to a value of the second table.

The labels of the second table may correspond to the descriptions of the column "History of mental illness" of the above-mentioned Table 2.

In an embodiment, the labels of the third table describe several types of crime scene evidences, each type being related to a value of the third table.

The labels of the third table may correspond to the descriptions of the column "Findings" of the above-mentioned Table 3.

In an embodiment, the labels of the fourth table describe the number of suicidal methods involved in the victim's death, each number being related to a value of the fourth table.

The labels of the fourth table may correspond to the descriptions of the column "Number of means" of the above-mentioned Table 4.

In an embodiment, the labels of the fifth table describe several types of suicidal methods and injuries to the victim with a suicidal dynamic, each type being related to a value of the fifth table.

The labels of the fifth table may correspond to the descriptions of the column "Features" of the above-mentioned Table 5.

In an embodiment, the labels of the sixth table describe several types of positive indicators of suicide, each type being related to a value of the sixth table.

The labels of the sixth table may correspond to the descriptions of the column "Positive indicators of suicide" of the above-mentioned Table 6.

In an embodiment, the values of the seventh tables correspond to at least one related label.

In an embodiment, the labels of the seventh table describe several categories of death, each category being related to a value of the seventh table.

The labels of the seventh table may correspond to the descriptions of the column "Category" of the above-mentioned Table 7.

The computing device 2 may be configured to calculate a total score based on the selected values.

In an embodiment, the seventh table is stored in the memory 3 of the computing device 2 and the computing device 2 is configured to compare the total score with the values of the seventh table and to classify the death as compatible with suicide or incompatible with suicide based on said comparison.

In particular, the computing device may be configured to classify the death among suicide, atypical suicide and incompatible with suicide.

In an embodiment, if the total score is incompatible with suicide, the telecommunications device 1 automatically alerts the predetermined authority to the incompatibility.

Methods for Using the Field Kit

Figure 4:
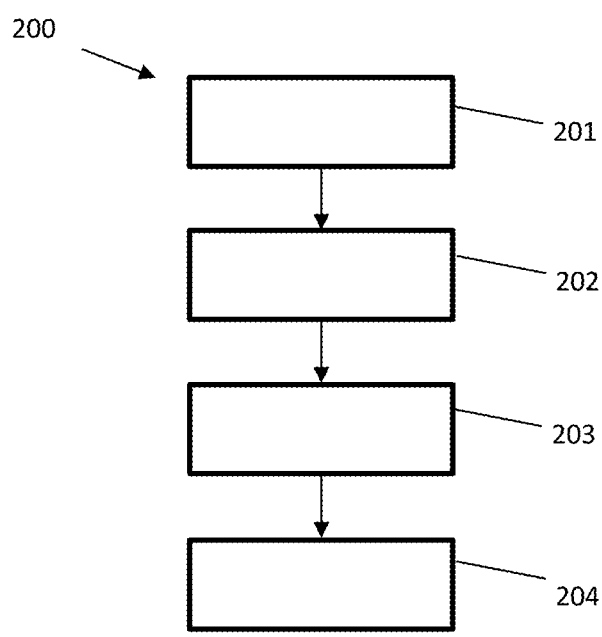
FIG. 4 is a flow diagram of an embodiment of a method for using a field kit according to the invention.

A first method 200 for using the field kit 100 is shown in FIG. 4.

At step 201, the method 200 comprises providing the field kit 100 to an investigator. At step 202, the method 200 comprises using the first through sixth tables to determine values and inputting the values into the computing device 2. At step 203, the method 200 comprises using the computing device 2 to obtain a total score based on the inputted values, wherein the total score is to be compared against the seventh table of values. At step 204, the method 200 comprises using the telecommunication device 1 to contact a predetermined authority should the death be classified as incompatible with suicide.

Figure 5:
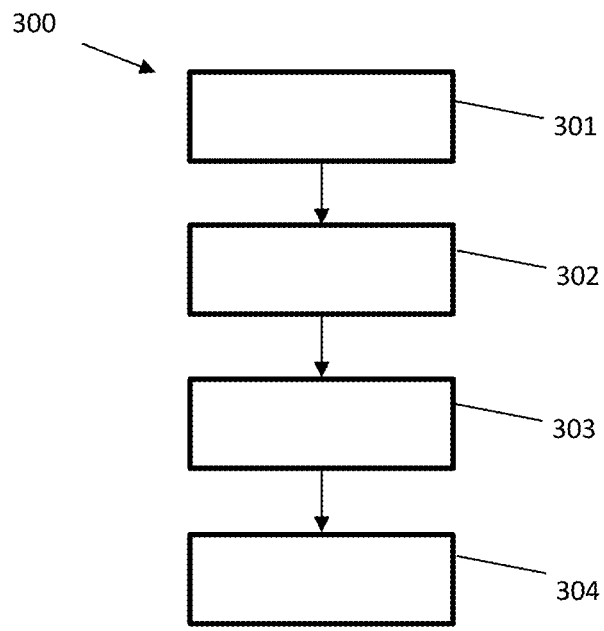
FIG. 5 is a flow diagram of an embodiment of a further method for using a field kit according to the invention.

A second method 300 for using the field kit 100 is shown in FIG. 5.

At step 301 the method 300 comprises providing the field kit 100 to an investigator, wherein the first through sixth tables of are stored in the memory 3 of the computing device 2. At step 302 the method 300 comprises selecting by a user input interface 7 of the computing device 2 a value for each of the first through sixth tables. At step 303 the method 300 comprises using the computing device 2 to obtain a total score based on the selected values, wherein the total score is to be compared against the seventh table of values. At step 304 the method 300 comprises using the telecommunication device 1 to contact a predetermined authority should the death be classified as incompatible with suicide.

In an embodiment, the seventh table is stored in the memory 3 of the computing device 2 and the first method 200 and/or the second method 300 comprise/comprises the step of using the computing device 2 to compare the total score with the values of the seventh table, and the step of classifying the death as compatible with suicide or incompatible with suicide based on said comparison.

In an embodiment, the field kit 100 comprises an image gathering device 5 and the first method 200 and/or the second method 300 comprise/comprises the step of using the image gathering device 5 to obtain at least one image of the death scene.

In an embodiment, the image gathering device 5, the telecommunications device 1 and the computing device 2 are in communication with each other and are contained in a single unit 6 and the at least one image obtained by the image gathering device 5 is scanned for an identified marker corresponding to a presence of positive indicators of suicide.

In an embodiment, the image gathering device 5, the telecommunications device 1 and the computing device 2 are in communication with each other and are contained in a single unit 6 and if the total score is incompatible with suicide, the telecommunications device 1 automatically alerts the predetermined authority to the incompatibility.

Figure 6:
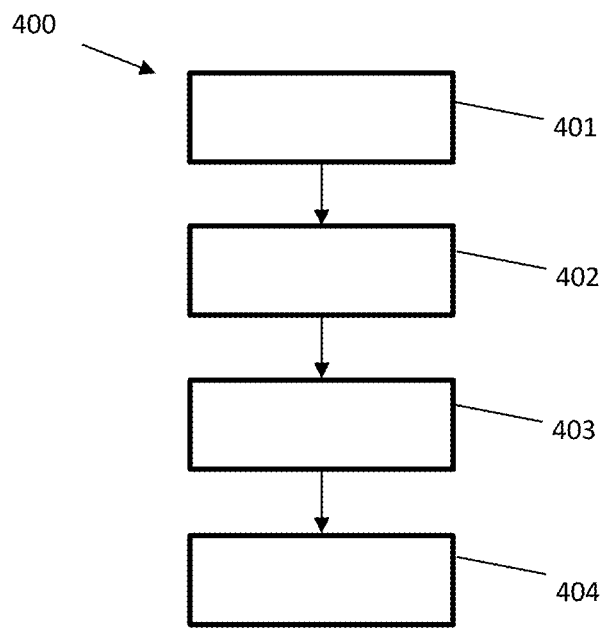
FIG. 6 is a flow diagram of an embodiment of a further method for using a field kit according to the invention.

A third method 400 for using the field kit 100 is shown in FIG. 6.

At step 401, the method 400 comprises providing the filed kit 100 to an investigator, wherein the field kit 100 comprises an image gathering device 5. At step 401, the method 400 comprises using the image gathering device 5 to obtain at least one image of the death scene. At step 402, the method 400 comprises using the computing device to analyze the at least one image for an identified marker corresponding to a presence of positive indicators of suicide, wherein the computing device 2 comprises a display 8. At step 403, the method 400 comprises generating a score based on the analyzed at least one image. At step 404, the method 400 comprises outputting the score to the investigator via the display 8, wherein the investigator compares the score against the first through seventh tables of values, and wherein the investigator uses the telecommunication device 1 to contact a predetermined authority should the score be inconsistent with suicide.

The invention claimed is:

1. A field kit for a death scene investigation comprising:
    a computing device comprising a memory and a processor, the computing device comprising:
        a data structure stored in the memory comprising at least six predefined data tables, wherein each table comprises structured fields and associated labels representing forensic indicators, the forensic indicators being selected from the group consisting of: causes of death; history of a victim's mental illness, consistency between death scene evidence and a suicidal dynamic; suicidal methods involved in the victim's death; compatibility of suicidal methods and injuries to the victim with a suicidal dynamic; and presence of positive indicators of suicide;

a user interface configured to receive user inputs selecting a value from each of the six tables;

wherein the processor is configured to compute a total score based on said selected values, and to compare the score with a seventh predefined table stored in memory to generate an output corresponding to a classification of death between a death compatible with a suicide and a death incompatible with a suicide; and a telecommunication module configured to transmit said classification to a predetermined authority when the score exceeds a threshold indicating incompatibility with suicide.

2. The field kit of claim 1, wherein the field kit further comprises an image-gathering device.

3. The field kit of claim 2, wherein the image-gathering device, the telecommunication module and the computing device are contained in a single unit.

4. The field kit of claim 1, wherein the first through sixth tables are stored in the memory of the computing device.

5. The field kit of claim 4, wherein the computing device comprises a user input interface that prompts a user to select a value for each of six tables.

6. The field kit of claim 5, wherein the values of each of the six tables correspond to at least one related label and wherein a value is assigned by selecting at least one label for each of the six tables.

7. The field kit of claim 5, wherein the computing device is configured to calculate a total score based on the selected values.

8. The field kit of claim 7, wherein the seventh table is stored in the memory of the computing device and the computing device is configured to compare the total score with the values of the seventh table and to classify the death as compatible with suicide or incompatible with suicide based on said comparison.

9. The field kit of claim 8, wherein the computing device is configured to classify the death as: suicide, atypical suicide or incompatible with suicide.

10. The field kit of claim 8, wherein if the total score is incompatible with suicide, the telecommunication module automatically alerts the predetermined authority to the incompatibility.

11. A computer-implemented method for evaluating a death scene using the field kit of claim 1, the method comprising:

providing the field kit to an investigator;
selecting a value from each of the six tables;
calculating a score via the processor
comparing the score to be compared against the seventh predefined table;
generating a classification of the death; and
automatically contacting a predetermined authority using the telecommunication module if the classification indicates incompatibility with suicide.

12. The method of claim 11, wherein the field kit further comprises an image gathering device and the method further comprises using the image gathering device to obtain at least one image of the death scene.

13. The method of claim 12, wherein the image gathering device, the telecommunication module and the computing device are in communication with each other and are contained in a single unit and wherein the at least one image obtained by the image gathering device is scanned for an identified marker corresponding to a presence of positive indicators of suicide.

14. The method of claim 12, wherein the image gathering device, the telecommunication module and the computing device are in communication with each other and are contained in a single unit and wherein if the total score is incompatible with suicide, the telecommunications device automatically alerts the predetermined authority to the incompatibility.

* * * * *